United States Patent
Mongazon-Cazavet et al.

(10) Patent No.: US 8,755,364 B2
(45) Date of Patent: Jun. 17, 2014

(54) METHOD FOR MANAGING MOBILITY OF A MOBILE DEVICE WITHIN A NETWORK USING A PROXY MIPV6 PROTOCOL

(75) Inventors: Bruno Mongazon-Cazavet, Nozay (FR); Laurence Gras, Nozay (FR)

(73) Assignee: Alcatel Lucent, Paris (FR)

( * ) Notice: Subject to any disclaimer, the term of this patent is extended or adjusted under 35 U.S.C. 154(b) by 386 days.

(21) Appl. No.: 13/130,975

(22) PCT Filed: Nov. 20, 2009

(86) PCT No.: PCT/EP2009/065574
§ 371 (c)(1),
(2), (4) Date: Sep. 12, 2011

(87) PCT Pub. No.: WO2010/060871
PCT Pub. Date: Jun. 3, 2010

(65) Prior Publication Data
US 2011/0317677 A1     Dec. 29, 2011

(30) Foreign Application Priority Data
Nov. 25, 2008     (EP) ..................................... 08291111

(51) Int. Cl.
*H04W 40/00*      (2009.01)

(52) U.S. Cl.
USPC .......................................... 370/338; 370/351

(58) Field of Classification Search
USPC ............ 370/328, 331, 338; 713/170; 455/436
See application file for complete search history.

(56) References Cited

U.S. PATENT DOCUMENTS

2005/0129032 A1* 6/2005 Kim et al. ..................... 370/400
2008/0012576 A1   1/2008 Sato et al.

(Continued)

FOREIGN PATENT DOCUMENTS

JP    2007/166278 A    6/2007
JP    2010/517438 A    5/2010

(Continued)

OTHER PUBLICATIONS

Leung G Dommety et al: "WIMAX Forum/3GPP2 Proxy Mobile IPv4; draft-leung-mip4-proxy-mode-O3.txt" IETF Standard-Working-Draft, Internet Engineering Task Force, IETF, CH, No. 3, Jul. 3, 2007, hereafter Leung.*

(Continued)

*Primary Examiner* — Yemane Mesfin
*Assistant Examiner* — Henry Baron
(74) *Attorney, Agent, or Firm* — Fay Sharpe LLP

(57) ABSTRACT

Method for managing mobility of a mobile device (MS) within a network using a proxy MIPv6 protocol comprising MAG and LMA logical functions, wherein MAG issues a PBU to bind the mobile device (MS) with the LMA, a LMA-time being initialized and maintained within the LMA and the method comprising a relative time synchronization procedure between LMA and all of the MAG connected to it, said procedure providing that each MAG sends a PBU with specific semantics to request the LMA-time, the PBU acknowledgement (PBU-Ack) sent by the LMA including such LMA-time, said LMA-time being further maintained within each MAG, the method further comprising a binding procedure in which all of the MAG insert in each PBU sent a timestamp including the current maintained LMA-time. Upon receipt of a LMA-timestamped PBU from a MAG, the LMA sends a successful PBU-Ack if no other MAG currently binds the mobile device (MS) with the LMA or if the timestamp is newer than the one received from the MAG currently binding the mobile device (MS); an out of date PBU-Ack if the timestamp is not newer than the one received from the MAG currently binding the mobile device (MS).

18 Claims, 1 Drawing Sheet

(56) References Cited

U.S. PATENT DOCUMENTS

2008/0182576 A1 7/2008 Tsirtsis et al.
2010/0202350 A1* 8/2010 Mizukoshi .................... 370/328
2010/0284329 A1* 11/2010 Park et al. .................... 370/328

FOREIGN PATENT DOCUMENTS

WO WO 00/51366 A2 8/2000
WO WO 2008/092641 A1 8/2008

OTHER PUBLICATIONS

Leung G. et al., "WiMax Forum/3GPP2 Proxy Mobile IPv4 draft-leung-mip4-proxy-mode-03.txt," Internet Engineering Task Force, No. 3, XP015051928, pp. 1-20, Jul. 3, 2007.

Perkins c. et al., "IP Mobility Support for IPv4 rfc3220.text," Internet Engineering Task Force, XP015008999, pp. 1-88, Jan. 1, 2002.
International Search Report for PCT/EP2009/065574 dated Feb. 15, 2010.
English Bibliography for Japanese Patent App. Publication No. JP2007166278A, published Jun. 28, 2007, printed from Thomson Innovation on Oct. 11, 2013, 3 pp.
English Bibliography for Japanese Patent App. Publication No. JP2010517438A, published May 20, 2010, printed from Thomson Innovation on Oct. 11, 2013, 3 pp.
RFC: 3775, Johnson et al., "Mobility Support in IPv6", Jun. 2004, 165 pp.
RFC: 5213, Gundavelli et al., "Proxy Mobile IPv6", Aug. 2008, 92 pp.

* cited by examiner

METHOD FOR MANAGING MOBILITY OF A MOBILE DEVICE WITHIN A NETWORK USING A PROXY MIPV6 PROTOCOL

The invention relates to a method for managing mobility of a mobile device within a network using a proxy MIPv6 protocol, a Mobile Access Gateway MAG logical function and a Local Mobility Anchor LMA logical function for such a protocol, as well as a network using a proxy MIPv6 comprising such logical functions.

The mobile IPv6 protocol (Internet Protocol version 6)—also named MIPv6—is defined by the IETF (see D. Johnson, C. Perkins, J. Arkko, 'Mobility Support in IPv6', IETF RFC 3775, June 2004, available at http://www.ietf.org). It is an IP-based mobility protocol that enables mobile devices (also called mobile nodes or mobile stations) to move between subnets in a manner which is transparent for higher layers and applications, i.e. without breaking higher-layer connections. Thus, the mobile devices remain reachable while moving around in the IPv6 internet network.

The main principle of MIPv6 is that a mobile node is always identified by its Home-Of Address (HoA), regardless of its topological location on the internet, while a Care-Of Address (CoA) of the mobile device provides information about the current topological location of the mobile device.

In order to manage IPv6 mobility for a mobile device, IETF has defined a proxy MIPv6 protocol. The protocol is based on two logical functions: MAG (Mobile Access Gateway) and LMA (Local Mobility Anchor). The MAG function is responsible for handling network access of the mobile device and performing MIPv6 signalling (Binding protocol) toward the LMA function (acting as an extended Home Agent HA) on behalf of the device.

In particular, the MAG is a router embedded in a device that terminates a specific bind layer technology to which mobile devices attach themselves. The LMA is a router that terminates connections to multiple MAG and handles mobility requests for a mobile device moving within the network.

When a mobile device is roaming between different MAG connected to the same LMA, each MAG issues a PBU (Proxy Binding Update) after the device has performed entry to the MAG's access network.

However, depending on the network and the roaming conditions, the concurrent PBU from different MAG might be received by the LMA out of date. For example the LMA can receive last a PBU that was issued first.

Consequently, a mechanism should be put in place to ensure PBU ordering at LMA level in order to keep track of the current device location. The IETF specification investigates two methods: sequence numbers and timestamps.

The sequence numbers solution proposes that each PBU issued by a MAG carries a sequence number. The solution works when multiple PBU are issued by the same MAG but it needs refinement when the terminal changes MAG. To refine this solution, the IETF proposes that the sequence number of a terminal is made persistent and retrieved by the MAG at authentication time using an AAA (Authentication, Authorization and Accounting) infrastructure. This refinement does not gather much agreement at the IETF because it introduces additional dependencies in the MIPv6 protocol.

The timestamps solution proposes that each PBU issued by a MAG carries a timestamp. To work this solution would require the LMA and the MAG to be time-synchronized in an absolute manner. This implies the use of time synchronization protocols such as NTP (Network Time Protocol). This refinement does not either gather much agreement at the IETF because it introduces additional dependencies and complexity in the MIPv6 protocol.

Consequently, the prior art methods currently fail to provide a simple, efficient and actually working solution to order the PBU at the LMA level when a mobile device is roaming between different MAG connected to said LMA. The invention aims to propose a method for managing such mobility, said method relying on a simple MIPv6 binding protocol extension and not requiring additional protocol dependencies.

For that purpose, and according to a first aspect, the invention proposes a method for managing mobility of a mobile device within a network using a proxy MIPv6 protocol comprising Mobile Access Gateway (MAG) and Local Mobility Anchor (LMA) logical functions, wherein a mobile device is roaming between different MAG connected to the same LMA and, when the mobile device performs entry to a MAG's access network, said MAG issuing a Proxy Binding Update (PBU) to bind the mobile device with the LMA. The LMA-time is initialized and maintained within the LMA and the method comprises a relative time synchronization procedure between LMA and all of the MAG connected to it, said procedure providing that each MAG sends a PBU with specific semantics to request the LMA-time, the PBU acknowledgement (PBU-Ack) sent by the LMA including such LMA-time, said LMA-time being further maintained within each MAG, the method further comprising a binding procedure in which all of the MAG insert in each PBU sent a timestamp including the current maintained LMA-time, the binding procedure providing that, upon receipt of a LMA-timestamped PBU from a MAG, the LMA sends:

- a successful PBU-Ack if no other MAG currently binds the mobile device with the LMA or if the timestamp is newer than the one received from the MAG currently binding the mobile device;
- an out of date PBU-Ack if the timestamp is not newer than the one received from the MAG currently binding the mobile device.

Thus, relative time synchronization between the LMA and the MAG is performed and then the timestamps method is used to ensure the PBU ordering. In addition, the invention relies on the use of MIPv6 signaling to perform such a time synchronization by using regular PBU with specific semantics and PBU/PBU-acknowledgment exchanges.

According to a second aspect, the invention proposes a Mobile Access Gateway (MAG) logical function for a proxy MIPv6 protocol, said MAG issuing a Proxy Binding Update (PBU) to bind a mobile device with a Local Mobility Anchor (LMA) logical function, said MAG requesting a relative time synchronization procedure with LMA by using specific semantics in PBU, said MAG comprising means for maintaining LMA-time in it and means for inserting in each PBU sent a timestamp including the current maintained LMA-time.

According to a third aspect, the invention proposes a Local Mobility Anchor (LMA) logical function for a proxy MIPv6 protocol, said LMA issuing a Proxy Binding Update (PBU) acknowledgment (PBU-Ack) in response to a PBU sent by a Mobile Access Gateway (MAG) logical function by means of which a mobile device performs entry, said LMA comprising means to initialize and maintain a LMA-time in it and means to perform a binding procedure providing that, upon receipt of a LMA-timestamped PBU from a MAG, the LMA sends:

a successful PBU-Ack if no other MAG currently binds the mobile device with the LMA or if the timestamp is newer than the one received from the MAG currently binding the mobile device;

an out of date PBU-Ack if the timestamp is not newer than the one received from the MAG currently binding the mobile device.

According to a fourth aspect, the invention proposes a network using a proxy MIPv6 protocol comprising such Mobile Access Gateway (MAG) logical function and such Local Mobility Anchor (LMA) logical function.

Other aspects and advantages of the invention will become apparent in the following description made with reference to the appended figures, wherein.

The invention concerns a method for managing mobility of a mobile device MS, such as a mobile terminal or a station, within a network using a proxy MIPv6 protocol as defined by the IETF.

In particular, the MIPv6 protocol comprises MAG (Mobile Access Gateway) and LMA (Local Mobility Anchor) logical functions. The MAG function is responsible for handling network access of a mobile device MS and performing MIPv6 signalling (binding protocol) toward the LMA function (acting as an extended Home Agent HA) on behalf of devices.

When a mobile device MS is roaming between different MAG connected to the same LMA, said mobile device performs entry to a MAG's access network. Then, the MAG issues a PBU (Proxy Binding Update) to bind the mobile device MS with the LMA.

The method comprises a relative time synchronization procedure between LMA and all of the MAG connected to it. To do so, the LMA-time is initialized and maintained within the LMA. In particular, the LMA-time is initialized and maintained by the LMA to always increase through LMA activity and restart.

The relative time synchronization procedure provides that each MAG sends a PBU with specific semantics to request the LMA-time, the PBU acknowledgement (hereafter PBU-Ack) sent by the LMA including such LMA-time. For example, the specific semantics can correspond to a predefined value for Care-Of Address CoA and Home-Of Address HoA of the MIPv6 PBU. In particular, the predefined value could be null or other values that would not conflict in the domain space.

Then the LMA-time is maintained within each MAG. In addition, time precision can be associated to the LMA-time, said time precision being inserted in the PBU-Ack in order for the MAG to maintain LMA-time within said precision. For example, the precision could be expressed in a millisecond multiple and is not greater than one second. The time value and time precision are defined by the LMA and are kept consistent for all of the MAG connected to this LMA.

Each MAG is responsible for maintaining the LMA-time with the corresponding precision. In particular, the MAG is responsible for applying locally any time correction that might result from local time deviation.

Figure 1:
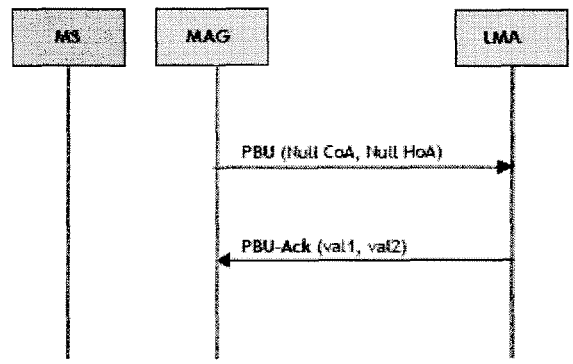
FIG. 1 represents the implementation of a relative time synchronization procedure according to one embodiment of the invention.

In relation with FIG. 1, the relative time synchronization procedure is initially performed at MAG startup or when the MAG discovers a new LMA. To do so, the MAG sends a PBU with Null CoA and Null HoA. The PBU is protected by the MAG-LMA security association.

The LMA, which has maintained its current time since start-up, replies with a PBU-Ack containing the current time value (val1) and clock precision (val2). The PBU-Ack is protected by the MAG-LMA security association. Then, the MAG stores the LMA-time and starts maintaining it at the specified precision.

In addition, further relative time synchronization procedures can be performed during the connection between the MAG and the LMA, said procedures being requested by the MAG in order to achieve LMA-time correction within said MAG.

Furthermore, if a MAG is connected to several LMA, the MAG performs initial and eventual further relative time synchronization procedures with all of the LMA it is connected to, each of the LMA-times being maintained separately within the MAG. In addition, the MAG is responsible for maintaining and using the correct LMA-time depending on the LMA that is the target of a PBU.

The method further comprises a binding procedure in which all of the MAG insert in each PBU sent a timestamp including the current maintained LMA-time.

The binding procedure provides that, upon receipt of a LMA-timestamped PBU from a MAG, the LMA sends:

a successful PBU-Ack if no other MAG currently binds the mobile device MS with the LMA or if the timestamp is newer than the one received from the MAG currently binding the mobile device MS;

an out of date PBU-Ack if the timestamp is not newer than the one received from the MAG currently binding the mobile device MS.

Thus, when the LMA receives a PBU for a mobile device MS, it must compare the timestamp carried in the PBU with the timestamp of the current binding one, if any. If the timestamp of the received PBU is newer than the current binding or if no binding currently exists for the mobile device MS, the LMA shall accept the PBU and send a successful PBU-Ack. If the timestamp is older than the current binding timestamp, then the PBU is out of date and shall be acknowledged by a PBU-Ack carrying a specific error condition ("out of date"). The PBU shall be silently discarded by the LMA and when a MAG receives a PBU-Ack with an out of date error condition, it shall consider the mobile device MS as out of its access network.

Figure 2:
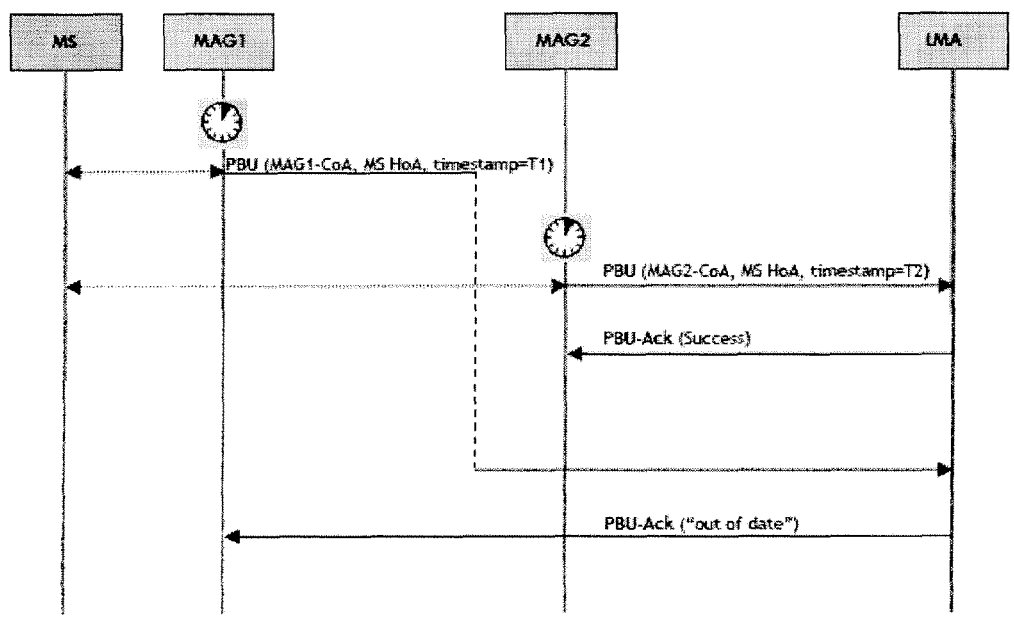
FIG. 2 represents the implementation of a binding procedure according to one embodiment of the invention.

In relation with FIG. 2, we describe below a binding procedure for two MAG with a LMA included in a network using a proxy MIPv6 protocol. Each MAG comprises means for maintaining LMA-time in it and means for inserting in each PBU sent a timestamp including the current maintained LMA-time. In addition, the LMA comprises means to initialize and maintain a LMA-time in it and means to perform a binding procedure as described above.

When the mobile device performs network entry at MAG1, it sends a PBU with timestamp=T1. T1 is the current time value for the LMA that is maintained by MAG1 since the last relative synchronization. Moreover, the PBU includes the MAG1-CoA and the MS HoA.

The mobile device MS roams fast and performs network entry at MAG2. MAG2 sends a PBU with timestamp=T2. T2 is the current time value for LMA that is maintained by MAG2 since the last relative synchronization. Since MAG1 and MAG2 have the same LMA time reference, T2 is greater than T1.

If transit delay between MAG1 and the LMA is excessive and transit delay between MAG2 and the LMA is very low, the LMA receives MAG2 PBU first. It stores the PBU for the mobile device MS. The LMA receives MAG1 PBU last. It compares the received PBU timestamp (T1) with the current PBU timestamp (T2). Since T2 is greater than T1, the LMA considers MAG1 PBU as late (delayed) and rejects the PBU with an out of date error code in the PBU-Ack.

The invention claimed is:

1. Method for managing mobility of a mobile device within a network, comprising:
   at a Local Mobility Anchor (LMA) of an internet protocol (IP) network, initializing and maintaining an LMA-time within the LMA;
   performing a relative time synchronization procedure between the LMA and a plurality of Media Access Gateways (MAGs) connected to the LMA using MIPv6 signaling, said relative time synchronization procedure comprising:
      receiving a first Proxy Binding Update (PBU) request with specific semantics from each MAG in conjunction with the corresponding MAG connecting to the LMA, each first PBU request requesting the LMA-time, wherein the specific semantics correspond to predefined values for a Care-Of Address (CoA) and a Home-Of Address (HoA), the predefined values being either null or another value that does not conflict in domain space; and
      providing a first PBU acknowledgement with the LMA-time to MAGs from which first PBU requests were received, wherein MAGs receiving the first PBU acknowledgement maintain the LMA-time; and
   performing a binding procedure to bind the mobile device to the LMA using MIPv6 signaling, the binding procedure comprising:
      receiving a second PBU request from one or more MAG connected to the LMA in conjunction with the mobile device performing entry to an access network associated with the corresponding MAG, each second PBU request including a timestamp based on the LMA-time maintained by the corresponding MAG; and
      sending a second PBU acknowledgement to the corresponding MAG in response to each second PBU request received, wherein the second PBU acknowledgement includes a successful acknowledgement if no other MAG currently binds the mobile device with the LMA or if the timestamp in the corresponding second PBU request is newer than timestamps received in prior second PBU requests for binding the mobile device, wherein the second PBU acknowledgement includes an out of date acknowledgement if the timestamp in the corresponding second PBU request is not newer than timestamps received in prior second PBU requests for binding the mobile device.

2. Method according to claim 1, wherein the relative time synchronization procedure is initially performed in conjunction with startup of the corresponding MAG.

3. Method according to claim 2, wherein further relative time synchronization procedures are performed during the connection between the corresponding MAG and the LMA, said further procedures being requested by the corresponding MAG in order to achieve LMA-time correction within said corresponding MAG.

4. Method according to claim 1, wherein at least one MAG performs a relative time synchronization procedure with another LMA to which it is connected, each of the LMA-times being maintained separately within the corresponding MAG.

5. Method according to claim 1, wherein time precision is associated with the LMA-time, said time precision being inserted in the second PBU acknowledgement in order for the corresponding MAG to maintain LMA-time within said time precision.

6. Method according to claim 1, wherein the LMA-time is initialized and maintained by the LMA to increase through LMA activity and restart.

7. A network for managing mobility of a mobile device, comprising:
   a Local Mobility Anchor (LMA) configured to initialize and maintain an LMA-time within the LMA; and
   a plurality of Media Access Gateways (MAGs) connected to the LMA and configured to bind mobile stations roaming between the plurality of MAGs to the LMA;
   wherein the LMA and the plurality of MAGs are configured to perform a relative time synchronization procedure using MIPv6 signaling;
   wherein, in conjunction with the relative time synchronization procedure, the LMA is configured to receive a first Proxy Binding Update (PBU) request with specific semantics from each MAG in conjunction with the corresponding MAG connecting to the LMA, each first PBU request requesting the LMA-time, wherein the specific semantics correspond to predefined values for a Care-Of Address (CoA) and a Home-Of Address (HoA), the predefined values being either null or another value that does not conflict in domain space and to provide a first PBU acknowledgement with the LMA-time to MAGs from which the first PBU requests were received, wherein MAGs receiving the first PBU acknowledgement are configured to maintain the LMA-time;
   wherein the LMA and the plurality of MAGs are configured to perform a binding procedure to bind the mobile device to the LMA using MIPv6 signaling;
   wherein, in conjunction with the binding procedure, the LMA is configured to receive a second PBU request from one or more MAG connected to the LMA in conjunction with the mobile device performing entry to an access network associated with the corresponding MAG, each second PBU request including a timestamp based on the LMA-time maintained by the corresponding MAG and to send a second PBU acknowledgement to the corresponding MAG in response to each second PBU request received, wherein the second PBU acknowledgement includes a successful acknowledgement if no other MAG currently binds the mobile device with the LMA or if the timestamp in the corresponding second PBU request is newer than timestamps received in prior second PBU requests for binding the mobile device, wherein the second PBU acknowledgement includes an out of date acknowledgement if the timestamp in the corresponding second PBU request is not newer than timestamps received in prior second PBU requests for binding the mobile device.

8. The network according to claim 7, wherein the relative time synchronization procedure is initially performed in conjunction with startup of the corresponding MAG.

9. The network according to claim 8, wherein further relative time synchronization procedures are performed during the connection between the corresponding MAG and the LMA, the further procedures being requested by the corresponding MAG in order to achieve LMA-time correction within the corresponding MAG.

10. The network according to claim 7, wherein at least one MAG performs a relative time synchronization procedure with another LMA to which it is connected, each of the LMA-times being maintained separately within the corresponding MAG.

11. The network according to claim 7, wherein time precision is associated with the LMA-time, the time precision being inserted in the second PBU acknowledgement in order for the corresponding MAG to maintain LMA-time within the time precision.

12. The network according to claim 7, wherein the LMA-time is initialized and maintained by the LMA to increase through LMA activity and restart.

13. Method for managing mobility of a mobile device within a network, comprising:
  performing a relative time synchronization procedure between a Local Mobility Anchor (LMA) of an internet protocol (IP) network and a plurality of Media Access Gateways (MAGs) connected to the LMA using MIPv6 signaling, an LMA-time being previously initialized and maintained within the LMA, the relative time synchronization procedure comprising:
    sending a first Proxy Binding Update (PBU) request with specific semantics from each MAG to the LMA in conjunction with the corresponding MAG connecting to the LMA, each first PBU request requesting the LMA-time, wherein the specific semantics correspond to predefined values for a Care-Of Address (CoA) and a Home-Of Address (HoA), the predefined values being either null or another value that does not conflict in domain space;
    receiving a first PBU acknowledgement with the LMA-time from the LMA at MAGs from which first PBU requests were sent and received by the LMA; and
    maintaining the LMA-time at MAGs receiving the first PBU acknowledgement; and
  performing a binding procedure to bind the mobile device to the LMA using MIPv6 signaling, the binding procedure comprising:
    sending a second PBU request to the LMA from one or more MAG connected to the LMA in conjunction with the mobile device performing entry to an access network associated with the corresponding MAG, each second PBU request including a timestamp based on the LMA-time maintained by the corresponding MAG; and
    receiving a second PBU acknowledgement from the LMA at the corresponding MAG in response to each second PBU request received by the LMA, wherein the second PBU acknowledgement includes a successful acknowledgement if no other MAG currently binds the mobile device with the LMA or if the timestamp in the corresponding second PBU request is newer than timestamps received in prior second PBU requests for binding the mobile device, wherein the second PBU acknowledgement includes an out of date acknowledgement if the timestamp in the corresponding second PBU request is not newer than timestamps received in prior second PBU requests for binding the mobile device.

14. The method according to claim 13, wherein the relative time synchronization procedure is initially performed in conjunction with startup of the corresponding MAG.

15. The method according to claim 14, wherein further relative time synchronization procedures are performed during the connection between the corresponding MAG and the LMA, the further procedures being requested by the corresponding MAG in order to achieve LMA-time correction within the corresponding MAG.

16. The method according to claim 13, wherein at least one MAG performs a relative time synchronization procedure with another LMA to which it is connected, each of the LMA-times being maintained separately within the corresponding MAG.

17. The method according to claim 13, wherein time precision is associated with the LMA-time, the time precision being inserted in the second PBU acknowledgement in order for the corresponding MAG to maintain LMA-time within the time precision.

18. The method according to claim 13, wherein the LMA-time is initialized and maintained by the LMA to increase through LMA activity and restart.

* * * * *